United States Patent [19]

Sakamoto

[11] Patent Number: 5,032,747

[45] Date of Patent: Jul. 16, 1991

[54] STEPPING MOTOR

[75] Inventor: Masafumi Sakamoto, Gunma, Japan

[73] Assignee: Japan Servo Co., Ltd., Tokyo, Japan

[21] Appl. No.: 586,247

[22] Filed: Sep. 21, 1990

[30] Foreign Application Priority Data

Mar. 15, 1990 [JP] Japan .................................. 2-62574

[51] Int. Cl.$^5$ ............................................. H02K 37/00
[52] U.S. Cl. .................................. 310/49 R; 310/162; 310/185; 310/254; 310/261
[58] Field of Search ...................... 310/49 R, 162, 163, 310/164, 179, 185, 198, 254, 261, 269, 180, 181, 184, 200, 201, 202, 203, 204, 205, 206, 207

[56] References Cited

U.S. PATENT DOCUMENTS 4,761,574 8/1988 Nakagawa ............................ 310/12
4,843,270 6/1989 Dijken ................................. 310/208
4,857,782 8/1989 Tokio et al. ......................... 310/12

Primary Examiner—Steven L. Stephan
Assistant Examiner—Edward H. To
Attorney, Agent, or Firm—Nilles & Nilles

[57] ABSTRACT

A stepping motor wherein a following formula is satisfied:

$$W_{r2} = W_{s2} \pm (x_2 - ny_2),$$

where $W_{s2}$ is a tooth width of magnetic pole of a stator, $x_2$ is an interval of adjacent magnetic poles of the stator, $W_{r2}$ is a tooth width of pole tooth or a rotor, $y_2$ is an interval of adjacent pole teeth of the rotor, and n is an integer not less than 2.

6 Claims, 2 Drawing Sheets

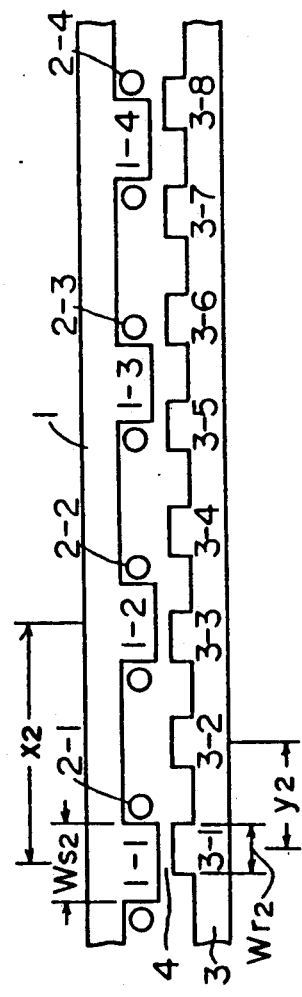
F I G . 1 (a)
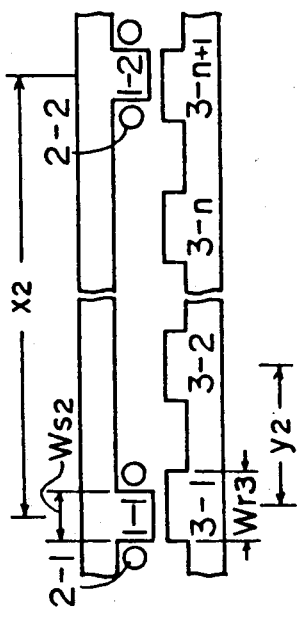
F I G . 1 (d)
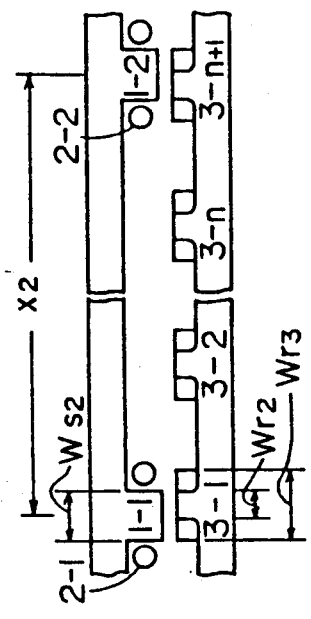
F I G . 1 (e)
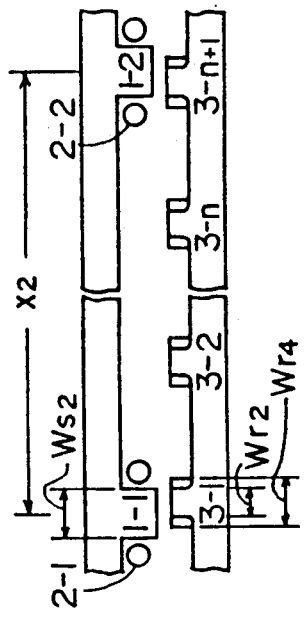
F I G . 1 (f)
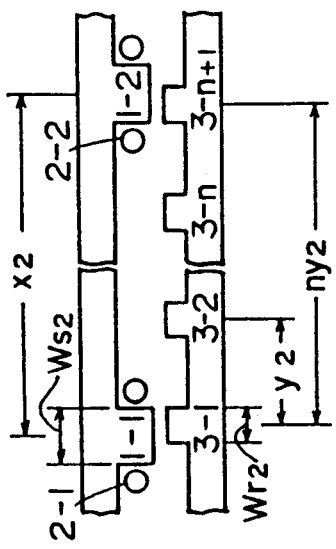
F I G . 1 (b)
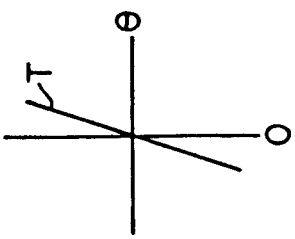
F I G . 1 (c)

STEPPING MOTOR

BACKGROUND OF THE INVENTION

1. Field of the Invention

This invention relates to a stepping motor and, more particularly, relates to an improvement of a stepping motor comprising a stator having magnetic poles, each of said magnetic poles having a winding wound thereon, and a rotor having pole teeth facing said stator magnetic poles through a gap.

2. Description of the Prior Art

FIG. 4 (a) is an expanded view of a conventional stepping motor illustrating the relation positions of the stator and the rotor thereof.

Reference numeral 1 denotes a yoke of the stator. 1-1-1-4 are stator magnetic poles provided on the yoke 1 equidistantly apart from one another. 2-1-2-4 are stator windings, each wound around each of said stator poles. Numeral 3 is the rotor, 3-1-3-5 are pole teeth provided on an outer periphery of the rotor 3, and 4 is a gap between the stator magnetic poles and the rotor pole teeth.

In the conventional stepping motor shown in FIG. 4(a), a tooth width $W_{s1}$ of each of the stator magnetic poles 1-1-1-4 is substantially the same as a tooth width $W_{r1}$ of each of the rotor pole teeth 3-1-3-5 facing the stator magnetic poles, measuring in a peripheral direction thereof. The number of stator magnetic poles is 4, for example, and they are disposed with an interval $x_1$ between them. The number of rotor pole teeth is 5, for example, and they are disposed with an interval $y_1$ between them which is different from said interval $x_1$. The intervals $x$, $x_1$, or $x_2$ are measured from the center of one stator magnetic pole, around which a coil is wound, to the center of the adjacent stator magnetic pole, around which a coil is wound, and the interval $y_2$ is measured from the center of one rotor pole to the center of the adjacent rotor pole.

The stator windings 2-1, 2-2, 2-3, and 2-4 are divided into four groups.

In the stepping motor shown in FIG. 4(a), the rotor is rotated stepwise by an angle when an electric current is passed successively through each of the four stator winding groups. The motion thereof will be explained in detail hereunder. FIG. 4(a) shows a state in which the pole tooth 3-1 of the rotor 3 is aligned with said stator magnetic pole 1-1 facing said pole tooth 3-1 through a gap by an electric current flowing through the stator winding 2-1 to generate an electromagnetic force on said stator magnetic pole 1-1. In this state, stator magnetic pole 1-2 and rotor pole tooth 3-2 partially overlap to each other by substantially a half of one tooth width, so that a portion of the pole tooth 3-2 of the rotor 3 projects leftwardly of the stator magnetic pole 1-2.

Similarly, the stator magnetic pole 1-4 and the rotor pole tooth 3-5 partially overlap each other by substantially a half of one tooth width, so that a portion of the pole tooth 3-5 of the rotor 3 projects rightwardly of the stator magnetic pole 1-4 rightwards. The stator magnetic pole 1-3, however, does not overlap any pole tooth of the rotor 3. In order to move the rotor one step from the state shown in FIG. 4(a), it is sufficient that electric current flow through the stator winding 2-2 and not flow through the stator winding 2-1. By doing so, the stator magnetic pole 1-2 attracts the pole tooth 3-2 of the rotor 3, which opposes and overlaps stator magnetic pole 1-2 by one half of one tooth width, by moving the rotor rightwards by one half of one tooth width until the pole 1-2 and pole tooth 3-2 are fully overlapping.

In order to move the rotor an additional step rightwards, it is sufficient that electric current flow through the stator winding 2-3 and not flow through said stator winding 2-2. By doing so, the stepping motor shown in FIG. 4(a) can be rotated stepwise each time a successive stator winding is energized. Such a driving system is a so called one-phase exciting system, which is the basic driving system.

In such a one-phase exciting system, however, only one set of stator windings is energized at any one time while the remaining sets of stator windings are deenergized. Output, therefore, is relatively low. Accordingly, a two-phase exciting system wherein two adjacent magnetic poles are magnetized at the same time has been used. In the two-phase exciting system, electric currents are sent through the stator windings 2-1 and 2-2 simultaneously as shown in FIG. 4(b). In this state, the pole tooth 3-1 of the rotor 3 is attracted to the stator magnetic pole 1-1 and the pole tooth 3-2 is attracted to the stator magnetic pole 1-2 so that the rotor 3 stops at a position where attracting forces exerted on both of said pole teeth of the rotor 3 are balanced. The relationship between the angular position of the rotor 3 and a torque T of rotation thereof is shown in FIG. 4(c). As shown in FIG. 4(c), the torque of rotation T is generated as a resultant torque of a torque of rotation $T_1$ generated by the stator magnetic pole 1-1 and a torque of rotation $T_2$ generated by the stator magnetic pole 1-2, which is larger than that obtained in the case of the one-phase exciting system.

However, employing the conventional stepping motor in the two-phase exciting system as mentioned above, the torques of rotation $T_1$ and $T_2$ are in proportion to the electric current value flowing through each winding, and relate to the air gap between the stator magnetic poles and the rotor pole teeth opposing each other so that the rotor 3 stops at a position where the torques of rotation $T_1$ and $T_2$ are balanced. Accordingly, the stop position of the two-phase exciting system is generally not as precise as that of the one-phase exciting system. Specifically, if the torques of rotation $T_1$ and $T_2$ are different from each other, the resultant torque T can not be passed through the origin of the coordinate in FIG. 4(c), so that positioning errors occur.

SUMMARY OF THE INVENTION

An object of the present invention is to provide a stepping motor which eliminate the defects mentioned above.

Another object of the present invention is to provide a stepping motor comprising a stator having magnetic poles, equidistantly apart from one another, each of said magnetic poles having a winding wound thereon, and a rotor having pole teeth, equidistantly apart from one another facing said stator magnetic poles through a gap, wherein the following formula is satisfied:

$$W_{r2} = W_{s2} - (x_2 - ny_2)$$

or $$W_{r2} = W_{s2} + (x_2 - ny_2)$$

where $W_{s2}$ is the stator magnetic pole tooth width, $x_2$ is an interval of adjacent magnetic poles of said stator, $W_{r2}$ is the rotor pole tooth width, $y_2$ is an interval of adjacent pole teeth of said rotor, and n is an integer not less than 2.

According to the stepping motor of the present invention, torques of rotation generated at the adjacent stator magnetic poles, respectively, are equal to each other, so that fringing effect occurs and the step angle error is reduced.

These and other objects and features of the present invention will become apparent from the following description in conjunction with the attached drawings.

BRIEF DESCRIPTION OF THE DRAWINGS

FIG. 1(a) is an expanded view showing the relative positions between a stator and a rotor of a stepping motor;

FIG. 1(b) is an enlarged view of the stepping motor shown in FIG. 1(a);

FIG. 1(c) is a view showing the relationship between the angular position of the rotor and the torque of rotation;

FIG. 1(d), FIG. 1(e) and FIG. 1(f) are views illustrating other embodiments of the stepping motor of the present invention;

DESCRIPTION OF THE PREFERRED EMBODIMENTS

An embodiment of this invention will be explained with reference to FIGS. 1(a) through 1(c).

Figure 4A:
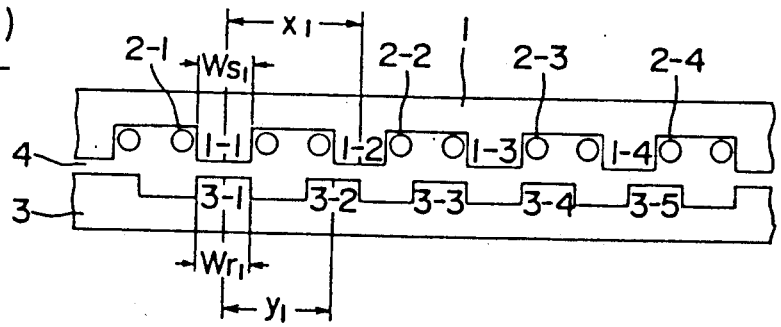
FIG. 4(a) is an expanded view showing the relative positions between the stator and the rotor of a conventional stepping motor.
Figure 4B:
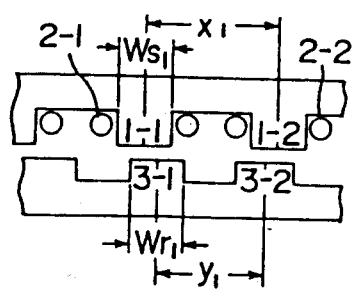
FIG. 4(b) is an alternate view of a conventional stepping motor of a two-phase exciting system.
Figure 4C:
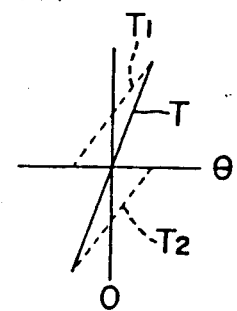
FIG. 4(c) shows the relationship between the angular position of the rotor and the torque of rotation.

In FIG. 1(a), the parts of the stepping motor of the present invention which are similar to corresponding parts of the prior art stepping motor shown in FIGS. 4(a) to 4(c) have been given corresponding reference numerals and need not be further redescribed.

In the stepping motor of this invention, stator magnetic poles and rotor pole teeth are arranged so as to satisfy the following formula, $$W_{s2} - W_{r2} = x_2 - ny_2$$

where $W_{s2}$ is the stator magnetic pole tooth width, $x_2$ is an interval of adjacent magnetic poles of the stator, $W_{r2}$ is the rotor pole tooth width, $y_2$ is an interval of adjacent rotor pole teeth of said rotor, and n is an integer equal to or more than 2.

The stepping motor of the present invention operates as follows.

In the stepping motor of the present invention, when electric currents are passed through stator windings 2-1 and 2-2 in case of the two-phase exciting system, the rotor pole teeth 3-1 and 3-3 are attracted to the magnetized stator magnetic poles 1-1 and 1-2, respectively, so as to oppose the stator magnetic poles as shown in FIG. 1(a), both right side faces of the stator magnetic pole 1-1 and the rotor pole tooth 3-1 being aligned with each other and both left side faces of the stator magnetic pole 1-2 and the rotor pole tooth 3-3 being aligned with each other.

Accordingly, in the present invention, precise positioning of the rotor can be increased at both right and left side faces thereof.

The relationship between the angular position $\theta$ and the torque of rotation T of the rotor will be explained with reference to FIGS. 1(b) and 1(c).

As shown in FIG. 1(b), the right side faces of the stator magnetic pole 1-1 and the rotor pole tooth 3-1 are aligned with each other so that the torque of rotation at this position becomes zero. Similarly, the left side faces of the stator magnetic pole 1-2 and the rotor pole tooth 3-n+1 are aligned with each other so that the torque of rotation at this position becomes zero. Accordingly, the angular position of the rotor is determined basically by the above relationship and affected little by the difference between electric current values flowing through the stator windings 2-1 and 2-2, respectively.

Further, the restoration torque of rotation generated when the rotor rotates by a very small angle from the stop position is larger than that in the conventional stepping motor shown in FIG. 4(c). This is the result of the fringing effect due to the magnetic flux issued from the portion of the stator magnetic pole which deviates from the side face of the rotor pole tooth, and maintains the stator magnetic pole and the rotor pole tooth in alignment with each other so that stop position precision is enhanced.

Now, the arrangement of the magnetic poles and the pole teeth shown in FIG. 1(a) is compared with that shown in prior art FIG. 4(a). In FIG. 4(a), the tooth width $W_{s1}$ of the stator magnetic poles and the tooth width $W_{r1}$ of the rotor pole teeth are substantially equal to each other, but the interval $x_1$ of the adjacent stator magnetic poles and the interval $y_1$ of the adjacent rotor pole teeth are different from each other. On the contrary, in FIG. 1(a), the stator magnetic poles and rotor pole teeth are arranged so as to satisfy the following formula, $$W_{r2} = W_{s2} - (x_2 - ny_2) \qquad (1)$$

where n is an integer not less than 2.

The reason why n is the integer not less than 2 is that in the actual stepping motor it is necessary to design the number of rotor poles to be at least twice the number of the stator magnetic poles. This enhances the resolving power by reducing the step angle and carrying out the positioning of the rotor by numerous pulses (preciseness of positioning can be increased if, for instance, where the desired angular change of position is 18°, the motor is positioned in ten step angles of 1.8° rather than in one large motor step angle of 18°). In other words, if the tooth width of the rotor is reduced by $(x_2 - ny_2)$ compared with the tooth width of the stator a stepping motor having the optimum precision in the two-phase exciting system can be obtained.

FIG. 1(d) shows another embodiment of the stepping motor of the present invention wherein the fringing effect in the two-phase exciting system is obtained at the outside faces of the stator magnetic poles 1-1 and 1-2.

In this embodiment, when the stator magnetic poles 1-1 and 1-2 are magnetized in the two-phase exciting system by electric currents flowing through the stator windings 2-1 and 2-2, the left side faces of the stator magnetic pole 1-1 and the rotor pole tooth 3-1 are aligned with each other and the right side faces of the stator magnetic pole 1-2 and the rotor pole tooth 3-(n+1) are aligned with each other, so that the fringing effect can be obtained as in the stepping motor shown in FIG. 1(b). In this case, the following formula is satisfied, $$W_{r3} = W_{s2} + (x_2 - ny_2) \quad (2)$$

where $W_{r3}$ is rotor pole tooth width.

That is, if the rotor pole tooth width $W_{r3}$ is increased by $(x_2 - ny_2)$ compared with the tooth width $W_{s2}$ of the stator magnetic pole, optimum precision can be obtained in the two-phase exciting system.

FIG. 1(e) shows a further embodiment of the present invention wherein rotor pole teeth satisfying the formulas (1) and (2) are provided.

In this embodiment, a rotor pole tooth having tooth width $W_{r2}$ satisfying formula (1) and a rotor pole tooth having tooth width $W_{r3}$ satisfying the formula (2) are superposed in the axial direction of the rotor with the center lines thereof being aligned. Accordingly, the right side face of the rotor pole tooth 3-1 having the tooth width $W_{r2}$ and the left side face of the rotor pole tooth having the tooth width $W_{r3}$ are aligned to the right and left side faces of the stator magnetic pole 1-1, respectively, whereas the left side face of the rotor pole tooth 3-(n+1) having the tooth width $W_{r2}$ and the right side face of the rotor pole tooth having the tooth width $W_{r3}$ are aligned to the left and right side faces of the stator magnetic pole 1-2, respectively, so that the fringing effect becomes twice that in the former embodiments in the two-phase exciting system.

Another embodiment of the stepping motor wherein stop position precision in the one-two phase exciting system can be enhanced is shown in FIG. 1(f). In the one-two phase exciting system, one-phase exciting and two-phase exciting are repeated. In other words, the one-phase exciting and the two-phase exciting are repeated for the windings in a sequence of the winding (2-1), (2-1 and 2-2), (2-2), (2-2 and 2-3), (2-3), (2-3 and 2-4), (2-4), (2-4 and 2-1), and (2-1) in FIG. 1(a), for example.

In this embodiment, a rotor pole tooth having tooth width $W_{r2}$ (or $W_{r3}$) satisfying formula (1) or (2)) and a rotor pole tooth having tooth width $W_{r4}$ which is similar to the tooth width of the stator magnetic pole 1-1 are superposed in the axial direction of the rotor with the center lines thereof being aligned.

In this embodiment, when only the stator magnetic pole 1-1 is magnetized by electric current flowing through only the stator winding 2-1 both side faces of the rotor pole tooth having tooth width $W_{r4}$ are aligned with both side faces of the stator magnetic pole, because the rotor pole tooth is the same width as the stator magnetic pole so that the fringing effect can be obtained. When both stator magnetic poles 1-1 and 1-2 are magnetized by electric currents flowing through both stator windings 2-1 and 2-2 the stator magnetic pole 1-1 is aligned with the rotor pole tooth 3-1 having tooth width $W_{r2}$ at the right side faces thereof and the stator magnetic pole 1-2 is aligned with the rotor pole tooth 3-(n+1) having tooth width $W_{r2}$ at the left side faces thereof so that the fringing effect can be obtained and of stop position precision can be enhanced in the one-two phase exciting system.

Figure 2:
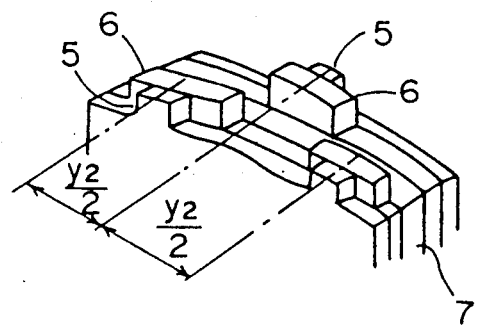
FIG. 2 is a perspective view of the rotor.

FIG. 2 is a perspective view of the rotor shown in FIGS. 1(e) or 1(f). Reference numeral 5 denotes a rotor pole tooth having tooth width $W_{r2}$, 6 denotes a rotor pole tooth having tooth width $W_{r3}$ or $W_{r4}$. This rotor can be formed as a rotor of the variable reluctance type having no permanent magnet, for example, or of the hybrid type wherein rotors 3 and 3 are provided on both sides of a permanent magnet 7 magnetized into two poles in the axial direction thereof. The rotor shown in FIG. 2 is of the hybrid type. In this case, the center lines of the pole teeth 5 and 6 of the rotors at both sides of the permanent magnet 7 deviate in the peripheral direction by $y_2/2$ from each other. The fringing effect can be obtained in the two-phase exciting system if the tooth widths of the stator magnetic poles which are magnetized by the same windings are set similar to those of the rotor pole teeth satisfying the formulas (1) and (2), or if the tooth width $W_{s2}$ of the stator magnetic pole shown in FIGS. 1(d) and 1(e) is set similar to the tooth width of the rotor pole tooth, for example.

Figure 3:
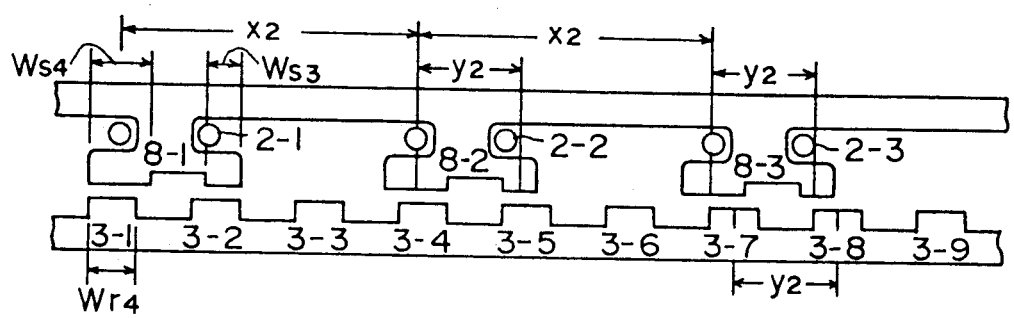
FIG. 3 is an expanded view showing the relative positions between the stator and the rotor of a further embodiment of the stepping motor of the present invention.

Further, the fringing effect can be obtained in the one-two phase exciting system if the rotor and stator are exchanged in tooth width with each other in the stepping motor shown in FIG. 1(f). Such a stepping motor is shown in FIG. 3. In the stepping motor shown in FIG. 3, stator magnetic pole portions having different tooth widths relative to each other are provided on both sides of each of the stator magnetic poles 8-1, 8-2, 8-3, . . . , so as to face the rotor pole teeth. The rotor pole teeth in FIG. 3 have an optimum width two-phase exciting system. Specifically, in FIG. 3, tooth width $W_{s4}$ of the left portion of the stator magnetic pole 8-1 is the same as tooth width $W_{r3}$ satisfying the formula (2), and a tooth width $W_{s3}$ of the right portion of the stator magnetic pole 8-1 is the same as tooth width $W_{r2}$ satisfying the formula (1), whereas tooth width $W_{r4}$ of each of the rotor pole teeth 3-1, 3-2, 3-3, . . . is identical to tooth width $W_{s2}$ explained in FIGS. 1(a), 1(b), 1(d), 1(e) and 1(f).

When the stator magnetic poles 8-1 and 8-2 are magnetized in the two-phase exciting system the fringing effect can be obtained at the left side of the rotor pole tooth 3-1 and the right side of the rotor pole tooth 3-2 with respect to the stator magnetic pole 8-1, as well as at the right side of the rotor pole tooth 3-4 and the left side of the rotor pole tooth 3-5 with respect to the stator magnetic pole 8-2, so that high precision positioning can be carried out in the two-phase exciting system. Further, in the stepping motor of the present invention the construction becomes simple and the manufacturing cost can be reduced because it is not necessary to superpose the rotor pole teeth as shown in FIG. 1(e) or 1(f), once the press mold is prepared for the stator.

As stated above, according to the present invention precise positioning in the two-phase exciting system or the one-two phase exciting system can be enhanced by this very simple construction.

The preciseness of the step angle 1.8° in the stepping motor of the present invention shown in FIG. 1(a) becomes ±1.5%, whereas in the conventional stepping motor shown in FIG. 4(a) becomes ±7%. It is preferable that the value of n in said formulas (1) and (2) is 2 to 10 practically, and more specifically, n is about 6 when the step angle is 3.6° and about 7 when the step angle is 0.9°, for example.

According to the present invention, precise positioning in the two-phase exciting system can be increased and the error in the step angle of the stepping motor can be reduced by the stepping motor construction of the present invention.

It should be understood that embodiments of the present invention not disclosed herein are fully intended to be within the scope of the claims.

What is claimed is:

1. In a stepping motor comprising a stator having magnetic poles, equidistantly apart from one another, each of said magnetic poles having a winding wound thereon, and a rotor having pole teeth, equidistantly apart from one another, facing said stator magnetic poles through a gap, the improvement characterized in that the following formula is satisfied:

$$W_{r2} = W_{s2} - (x_2 - ny_2),$$

where $W_{s2}$ is stator magnetic pole tooth width, $x_2$ is an interval of adjacent stator magnetic poles, $W_{r2}$ is rotor pole tooth width, $y_2$ is an interval of adjacent rotor pole teeth, and n is an integer not less than 2.

2. In a stepping motor comprising a stator having magnetic poles, equidistantly apart from one another, each of said magnetic poles have a winding wound thereon, and a rotor having pole teeth, equidistantly apart from one another, facing said stator magnetic poles through a gap, the improvement characterized in that the following formula is satisfied:

$$W_{r2} = W_{s2} + (x_2 - ny_2),$$

where $W_{s2}$ is stator magnetic pole tooth width, $x_2$ is an interval of adjacent stator magnetic poles, $W_{r2}$ is rotor pole tooth width, $y_2$ is an interval of adjacent rotor pole teeth, and n is an integer not less than 2.

3. In a stepping motor comprising a stator having magnetic poles, equidistantly apart from one another, each of said magnetic poles have a winding wound thereon, and a rotor having pole teeth, equidistantly apart from one another, facing said stator magnetic poles through a gap, the improvement characterized by a rotor wherein the following formula is satisfied:

$$W_{r2} = W_{s2} - (x_2 - ny_2),$$

and a rotor wherein the following formula is satisfied:

$$W_{r2} = W_{s2} + (x_2 - ny_2),$$

where $W_{s2}$ is stator magnetic pole tooth width, $x_2$ is an interval of adjacent stator magnetic poles, $W_{r2}$ is rotor pole tooth width of said rotors, $y_2$ is an interval of adjacent rotor pole teeth of said rotors, and n is an integer not less than 2, said two rotors are superposed on each other in an axial direction thereof with the centers of the teeth of said rotors being aligned with each other.

4. In a stepping motor comprising a stator having magnetic poles, equidistantly apart from one another, each of said magnetic poles have a winding wound thereon, and a rotor having pole teeth, equidistantly apart from one another, facing said stator magnetic poles through a gap, the improvement characterized in that each magnetic pole of said stator has at least one set of tooth width portions satisfying the following formulas, respectively:

$$W_{s2} = W_{r2} + (x_2 - ny_2), \text{ and}$$

$$W_{s2} = W_{r2} - (x_2 - ny_2),$$

where $W_{s2}$ is stator magnetic pole tooth width, $x_2$ is an interval of adjacent stator magnetic poles, $W_{r2}$ is rotor pole tooth width, $y_2$ is an interval of adjacent rotor pole teeth, and n is an integer not less than 2.

5. In a stepping motor comprising a stator having magnetic poles, equidistantly apart from one another, each of said magnetic poles have a winding wound thereon, and a rotor having pole teeth, equidistantly apart from one another, facing said stator magnetic poles through a gap, the improvement characterized in that said stator has at least one magnetic pole satisfying the following formula:

$$W_{s2} = W_{r2} + (x_2 - ny_2),$$

and has other magnetic poles each having a tooth width of $W_{r2}$, where $W_{s2}$ is stator magnetic pole tooth width, $x_2$ is an interval of adjacent stator magnetic poles, $W_{r2}$ is rotor pole tooth width, $y_2$ is an interval of adjacent rotor pole teeth, and n is an integer not less than 2.

6. In a stepping motor comprising a stator having magnetic poles, equidistantly apart from one another, each of said magnetic poles have a winding wound thereon, and a rotor having pole teeth, equidistantly apart from one another, facing said stator magnetic poles through a gap, the improvement characterized in that said stator has at least one magnetic pole satisfying the following formula:

$$W_{s2} = W_{r2} - (x_2 - ny_2),$$

and has other magnetic poles each having a tooth width of $W_{r2}$, where $W_{s2}$ is stator magnetic pole tooth width, $x_2$ is an interval of adjacent stator magnetic poles, $W_{r2}$ is rotor pole tooth width, $y_2$ is an interval of adjacent rotor pole teeth, and n is an integer not less than 2.

* * * * *